United States Patent [19]

Kotcharian

[11] 4,090,538

[45] May 23, 1978

[54] SYSTEM FOR LOADING AND UNLOADING AT SEA A TRANSPORTATION SHIP CONVEYING INCOHERENT PRODUCTS

[75] Inventor: Michel Kotcharian, Paris, France

[73] Assignee: Technigaz, Paris, France

[21] Appl. No.: 590,679

[22] Filed: Jun. 26, 1975

[30] Foreign Application Priority Data

| | | |
|---|---|---|
| Jun. 28, 1974 | France | 74 22767 |
| Oct. 11, 1974 | France | 74 34323 |
| Mar. 14, 1975 | France | 75 08062 |

[51] Int. Cl.[2] .......................... B65B 3/04; F16L 39/04

[52] U.S. Cl. .......................................... 141/100; 9/8 P; 61/86; 137/236 S; 141/302; 141/387

[58] Field of Search ................. 9/8 P; 137/236, 236.5; 141/279, 100, 284, 302, 387, 285, 388; 61/46, 46.5, 86, 94, 104; 114/.5 R, .5 BD, 230, 264, 267; 214/13, 14

[56] References Cited

U.S. PATENT DOCUMENTS

| | | | |
|---|---|---|---|
| 2,721,021 | 10/1955 | Day | 141/279 X |
| 2,894,268 | 7/1959 | Griebe | 9/8 P |
| 2,908,141 | 10/1959 | Marsh | 9/8 P X |
| 3,047,016 | 7/1962 | Andresen | 141/388 X |
| 3,464,466 | 9/1969 | Bryan | 61/104 X |
| 3,595,278 | 7/1971 | Lilly | 137/236 X |
| 3,620,268 | 11/1971 | Paddington | 141/279 X |
| 3,756,293 | 9/1973 | Adler et al. | 141/279 X |
| 3,773,093 | 11/1973 | Eustace | 9/8 P X |
| 3,778,854 | 12/1973 | Chow | 9/8 P |
| 3,838,718 | 10/1974 | Flory et al. | 9/8 P |
| 3,838,720 | 10/1974 | Hulstijn | 141/387 |
| 3,889,728 | 6/1975 | Riche | 137/236 X |
| 3,908,576 | 9/1975 | der Gaag | 9/8 P X |
| 3,910,609 | 10/1975 | der Gaag | 9/8 P X |
| 3,913,157 | 10/1975 | Versluis et al. | 9/8 P |

*Primary Examiner*—Richard E. Aegerter
*Assistant Examiner*—Frederick R. Schmidt
*Attorney, Agent, or Firm*—Kenyon & Kenyon, Reilly, Carr & Chapin

[57] ABSTRACT

A system for loading and/or unloading at sea a transportation vessel conveying incoherent products comprising ship mooring means, an arrangement for transferring or handling incoherent goods comprising a loading and/or unloading tower supported by the bottom of the sea and partially submerged as well as a movable loading boom associated with said tower, said mooring means being separated from or independent of said cargo transfer or handling arrangement.

14 Claims, 17 Drawing Figures

SYSTEM FOR LOADING AND UNLOADING AT SEA A TRANSPORTATION SHIP CONVEYING INCOHERENT PRODUCTS

The present invention relates to a system for loading and/or unloading at sea transportation ships and like conveying vessels carrying incoherent products capable of being poured such as fluid materials (gases, vapours, liquids) or divided or powdery solid materials capable of flowing.

The present trend with respect to the building in particular of tanker ships for conveying liquefied natural gas for instance is to increase their size and thereby the holding capacities of their tanks. The ship loading and unloading appliances should be designed according to the increase in the draughts of the vessels proper.

Now the available harbour facilities have generally not an adequate depth for enabling to accommodate large tonnage vessels. The building of new harbours often is a very expensive approach the achievement of which is made difficult for several grounds.

In the consuming countries the environmental problems and those of the lack of adapted sites are keenly felt. In particular unquestionable dangers and hazards result from the handling of significant amounts of inflammable liquefied gases near areas with high density of population. Moreover shelving seashores with a small slope frequently encountered in exporting countries make the digging of harbour facilities very expensive.

The design of loading and unloading plants at sea at some distance of the shore for instance has therefore been contemplated.

It is known for instance to moor or secure a ship to a buoy anchored at several points of the bottom of the sea. At least one under-water pipe-line leading from the shore and extending to an opening at the level of the buoy for instance may then be connected to ducts leading from the vessel proper.

According to another design a stationary tower built in the bottom of the sea is provided and adapted to support the end of the under-water pipe-line or the pipe-line itself. The vessel to be loaded or unloaded is directly moored to the tower which carries a loading arm or boom at its top. Such an arrangement wherein the mooring of the ship is combined with the loading system gives rise to difficulties and hazards when handling cryogenic or strongly subcooled fluids (liquefied natural gas for instance) in particular for safety reasons. Indeed the forces induced by the combined action of the current or stream, winds and waves upon the ship hence upon the tower proper may cause the tower to be broken.

In order to overcome these various inconveniences the object of the present invention is to provide a system for loading and/or unloading at sea a transportation vessel conveying incoherent products such as fluid or divided or powdery solid materials and like cargo, said system being of the kind comprising ship mooring means, and an arrangement for transferring or handling incoherent goods and like cargo including a loading and/or unloading tower supported on the bottom of the sea and only one portion of which is submerged, as well as a movable loading arm or boom associated with said tower, said system being characterized in that said mooring means are independent of or separated from said cargo transfer or handling arrangement.

According to another characterizing feature of the invention, said mooring means consist as known per se of at least one buoy-like floating body of such a shape that it encompasses said tower in spaced relationship, at least partially, said buoy being anchoring at a stationary location for instance to a solid body by means of chains, ropes or like lines made fast or secured to anchors and/or permanent moorings.

According to another characterizing feature of the invention, the loading and unloading system is such that said anchor chains or the like are crossing one another at least by pairs in interlocking relationship and connected to each other at their point of crossing, preferably through a chain link common to two chains or by means of a ring common to four chain sections.

According to a further characterizing feature of the invention, the loading and unloading system is such that said floating/body comprises shock absorbing or damping means for shielding it from shocks against the tower.

Experience has shown that in some particular cases difficulties may occur in operation owing to the use of said mooring means. Thus chain breaks or failures may sometimes occur at various locations in such special cases; under such circumstances the mooring of the ship is not provided satisfactorily thereby further increasing the risks or hazards inherent with the loading or unloading in particular of inflammable goods.

The present invention enables also in such special cases to overcome these difficulties by providing a construction which according to a further characterizing feature of the invention comprises a ship mooring column embedded or built into the bottom of the sea and surrounding the tower forming the support of the arrangement for transferring or handling incoherent goods while being fully separated from and independent of said tower.

According to still another characterizing feature of the invention the loading or unloading system thus comprises a fender tower for protecting against collision from the ship, embedded in the bottom of the sea in substantially concentric relation to the tower forming the support of said transfer and handling arrangement, said fender tower consisting possibly of said mooring column.

According to still another characterizing feature of the invention the loading arm or boom consists essentially of at least one duct for simultaneously carrying several fluids of different physical and/or chemical natures flowing in like or reverse directions, respectively.

According to still a further characterizing feature of the invention the ship comprises a piping assembly providing for the connection between the loading boom and the fluid ducts provided on the ship, said piping assembly on the ship comprising: a first pair of pipe-lines located at the upper part of said piping assembly and the structural shape of which is such that they form together a member mechanically equivalent to the first fork or yoke of a Cardan universal joint coupling the second fork or yoke of said universal joint coupling consisting of a second pair of pipe-lines; two pipe sections forming each one a branch or leg bent at right angles and rigidly braced so as to form the cross or composition member of said Cardan universal joint coupling.

Several advantages are provided by such a construction.

At first the mooring carried out by means of a mooring member rotatably mounted at the upper portion of the mooring column which is rigid and separated from the loading boom is effected very satisfactorily.

Moreover the provision at the end of the loading boom for instance of at least one pipe-line comprising two coaxial concentric pipes enables to provide for the simultaneous transfer of at least two fluids flowing either in the same direction or in opposite directions, respectively. This may be useful for mixing or blending fluids with each other (fluids flowing in a same direction) whereas the fluid flow in opposite directions corresponds to the cases of loading or unloading liquefied gas on or from a ship as already stated previously.

Furthermore the piping system on the ship forming a sub-assembly connecting the ship and the transfer or handling arrangement to each other is such that it enables a fully free connection between the ship and the transfer system. This will enable the ship to assume any directional attitude with respect to the loading crane consisting of the loading tower and of the loading boom. The ship is thus able according to the forces to which she is subjected to move freely around the transfer or handling system.

Further advantages and characterizing features of the invention will appear more clearly as the following description proceeds with reference to the accompanying diagrammatic drawings given by way of non-limiting examples only illustrating various presently preferred embodiments of the invention and wherein.

Figure 15:
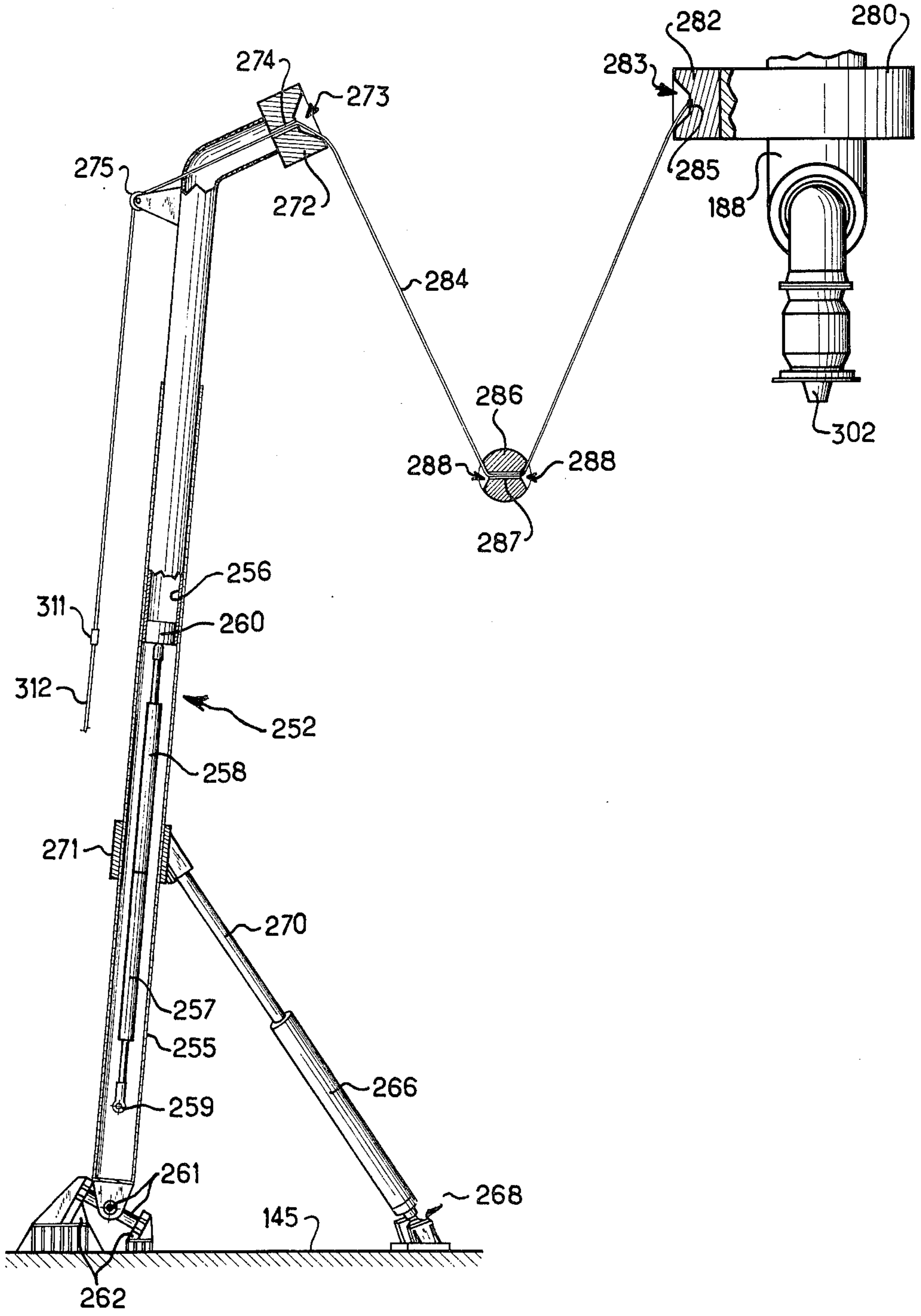
FIG. 15 is an enlarged view with parts broken away of a gripping jib-post mounted on the deck of the aforesaid ship as well as of the end of the movable loading boom the device being shown during the step of performing the coupling between said gripping jib-post and said end of the movable boom.
Figure 17:
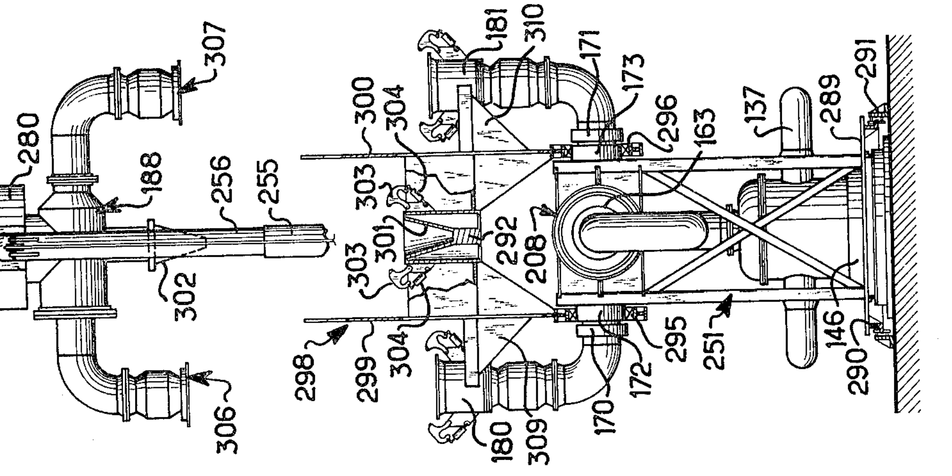
Figure 16:
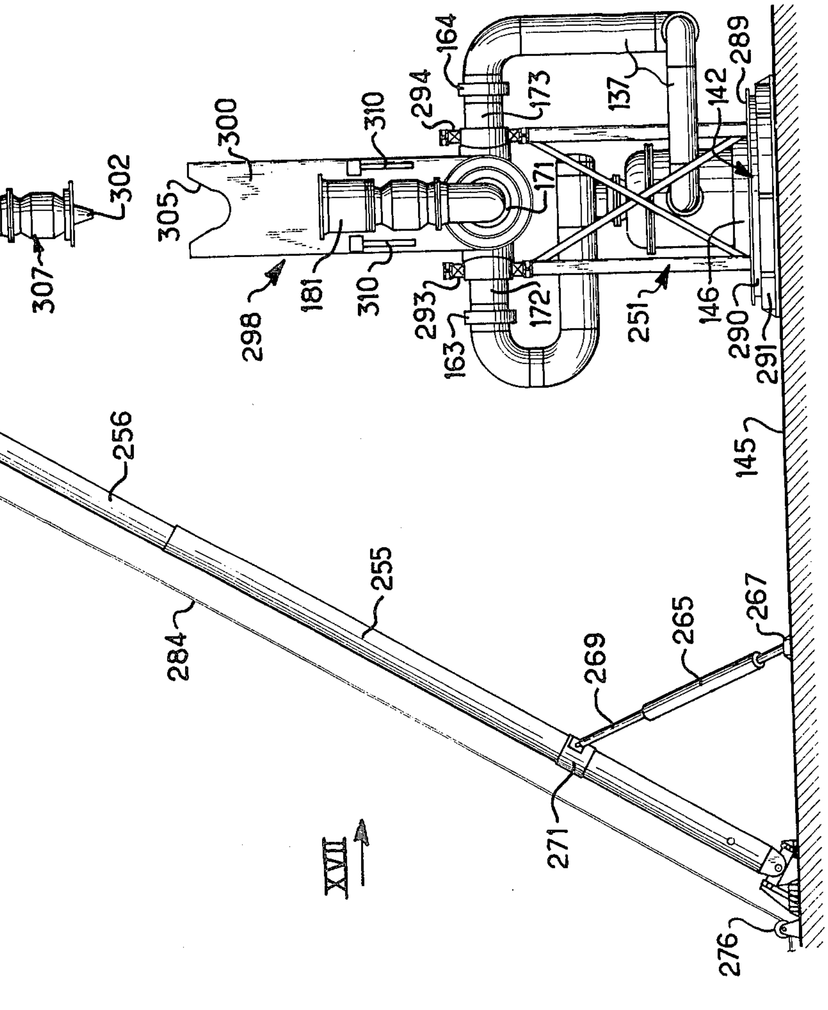

FIG. 16 is an elevational view drawn on a slightly reduced scale and in partial section and showing the same devices which are illustrated in FIG. 15 but coupled to each other and shown during the step of performing the connection of the end of the movable boom to the piping system on board the ship also shown; and FIG. 17 is a view in partial section looking in the direction of the arrow XVII in FIG. 16.

Figure 1:
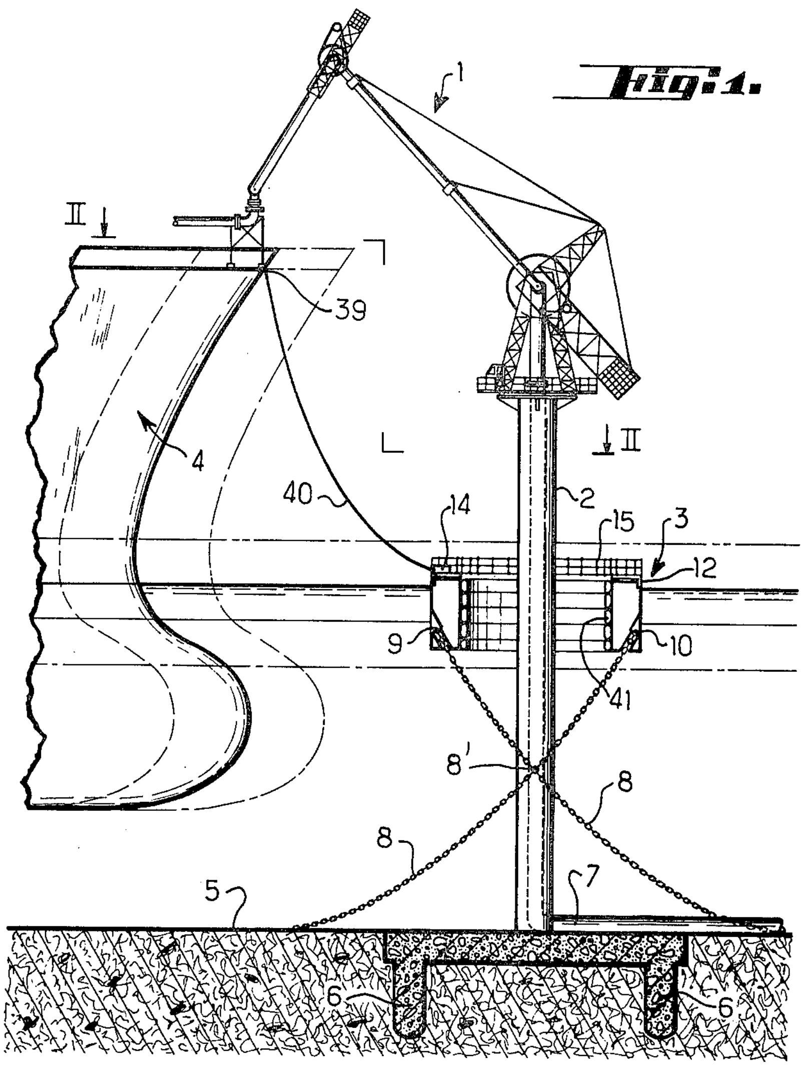
FIG. 1 is an elevational view, with parts broken away, of the whole ship loading and unloading system according to the invention.
Figure 2:
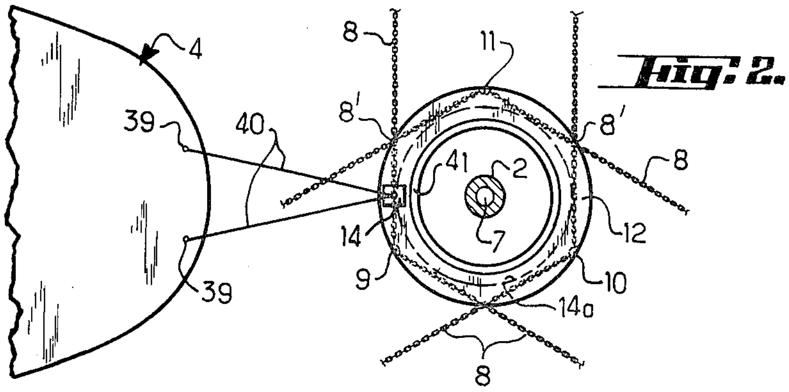
FIG. 2 is a top view of the preceding system in partial section taken upon the line II—II in FIG. 1.

According to the exemplary form of embodiment of FIG. 1, the system 1 for loading and unloading a ship 4 is mounted on a stationary tower 2 which is supported by the bottom of the sea, for instance embedded or built into the bottom 5 of the sea by means for instance of a foundation or like base 6. The tower 2 may also merely rest upon the bottom of the sea. Furthermore at least a pair of under-water pipe-lines 7 for loading and unloading purposes, respectively, leading from the shore for instance extend through the tower 2 to the loading system 1. The ring-shaped buoy-like floating body 3 surrounds the tower 2 and is moored thereto through the medium of several pairs of chains 8 crossing each other and interconnected at 8'; the chains 8 are also secured to the buoy 3 at 9, 10 and 11 (FIG. 2) and are anchored to the bottom 5 of the sea.

Shock absorbing or damping means 41, such as solid and resilient bumper or buffer members or inflated pneumatic tubes are desirably provided at the inner periphery of the buoy 3. The top face of the buoy 3 carries a device forming a rotary ring-shaped plate 12 adapted to revolve about the normally substantially vertical axis of said buoy, said device being for instance mounted on balls or rollers 13. The device 12 further comprises means 14 for mooring the ship for instance with one end thereof whereas a gangway 15 is also provided at the upper part of the buoy.

Figure 4:
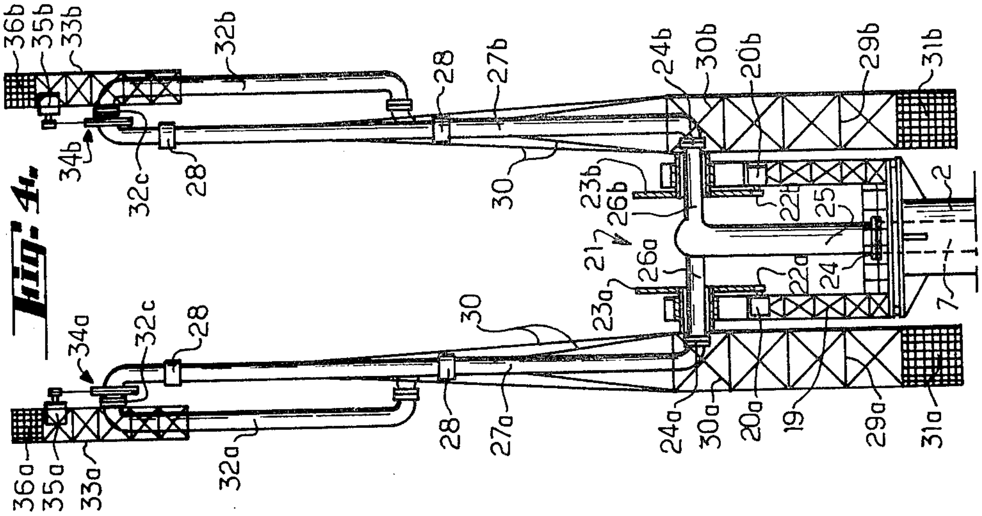
FIG. 4 is a side view seen in the direction of the arrow IV in FIG. 3 with parts broken away, showing said loading and unloading arm or boom in raised, disconnected, inoperative or rest position.
Figure 3:
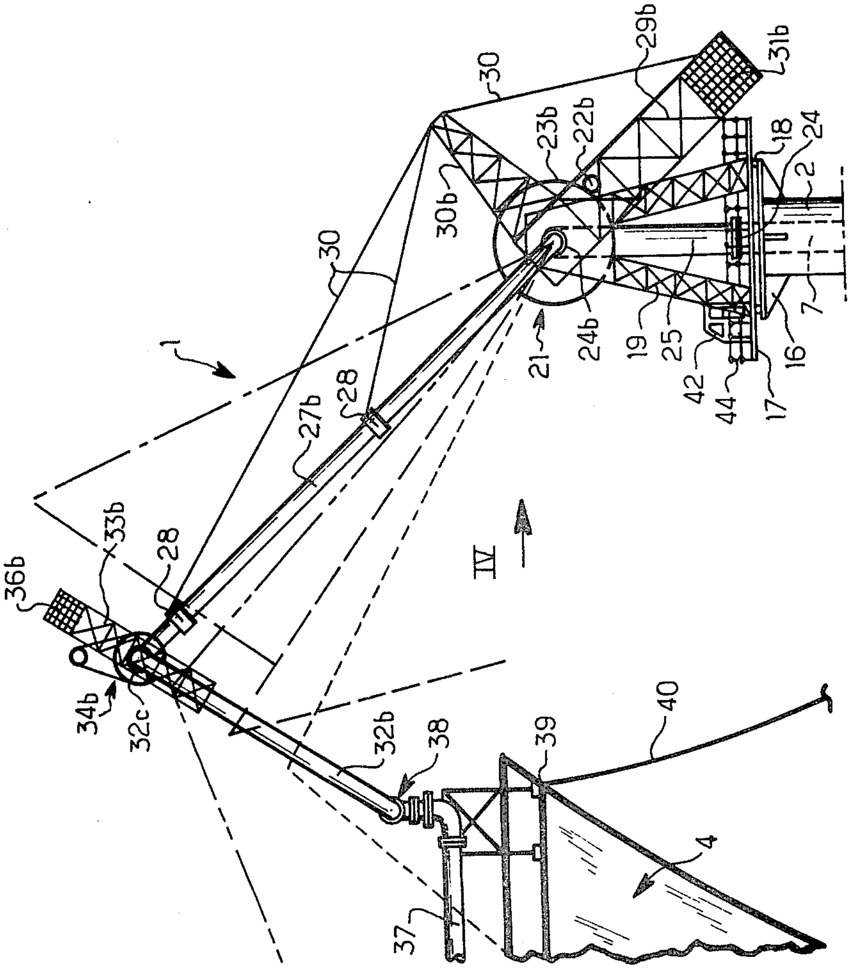
FIG. 3 is a fragmentary elevational view drawn on a larger scale with parts broken away, of the upper portion of the loading and unloading system which in working position is connected to the vessel.

According to FIGS. 3 and 4 the upper portion of the tower 2 comprises a platform 16 on which is mounted a device forming a turntable or like rotary plate 17 mounted on a ball or roller ring 18. The turntable 17 carries a metallic framework 19 forming a kind of derrick for instance. The framework 19 carries control motors or like prime movers **20*a* and 20*b* for operating a rocking or tilting device 21 with adjustable and selectively variable slope which comprises in particular a pair of gears 22*a* and 22*b* meshing with a pair of toothed ring gears 23*a*, 23*b***, respectively, provided in coaxial relation to a substantially horizontal common geometrical axis of swing.

Moreover the under-water pipe lines 7 communicate at 24 through seals or like rotary joints with a pair of pipes 25 the upper portions of which consist of two parts **26*a* and 26*b*** forming side branches extending in coaxial relation to the geometrical axis of swing of said rocking device. Each one of these parts is connected through a rotary joint 24a, 24b to a duct 27a, 27b carrying collars or like sleeves 28 for fastening to guys or like stay-wires. Metallic trussing or bracing structures forming beams 29a and 29b, respectively, are mounted for swinging motion in the vertical plane about the axis of rocking with respect to the metallic framework 19. They are each one supporting one of the ducts 27a and 27b by means of stay-wires 30 fastened to a mast 30a, 30b integral with the beam 29a, 29b and carry a balancing counterweight 31a, 31b at their ends, respectively.

In addition, each one of the ducts 27a, 27b communicates with a piping 32a, 32b rigidly connected to a metallic structure 33a, 33b. The pipings 32a and 32b are pivotally connected through rotary sealing joints 32c to the ducts 27a and 27b, respectively. Gear systems with pulley and belt drivings 34a and 34b operatively coupled to individual control motors or like power actuators 35a and 35b, respectively, as well as balancing counterweights 36a and 36b allow for the rotary selective displacement of the swivelling ducts 32a and 32b, respectively.

The ship includes at least one fluid-conveying duct and preferaby at least two fluid-conveying ducts 37 connected each one through a rotary sealing joint at 38 to at least one of the pipings 32a and 32b. It also comprises fastening points 39 to which are secured mooring lines 40 for the buoy.

The operation of this assembly takes place as follows:

After having secured the vessel to the buoy 3 at 14 by means of two mooring lines 40 preferably connected to two different fastening points, respectively, on the ship, the fluid-conveying ducts 37 are coupled to the loading arms 32a and 32b. When loading a ship with liquefied gases, the cargo tanks and pipings are at first cooled down before proceeding with filling same by means of one of the two aforesaid arms or booms. The gases evolved as a boil-off through evaporation of a fraction of the liquid cargo are conveyed back through the other arm and through pipings to the shore by means of compressors provided on board the ship or which are part of the storage facilities provided on land.

On the contrary when unloading the ship, the gases resulting as a boil-off from the evaporation of the liquid cargo are conveyed back to the ship tanks which are thereby kept under a pressure higher than the atmospheric pressure.

In use during the loading or unloading operations controlled in particular from the operator's booth 42, the ship 4 and the loading and unloading system 1 may assume various positions according to the stresses or forces they are undergoing. More specifically some of the positions assumed by the ducts 32 on the one hand and 27a and 27b on the other hand are shown by the several broken and chain-dotted lines drawn in FIGS. 1 and 3, respectively. Moreover, it should be noted that the ship may swing about the tower 2 owing to the provision of the turntable 12 on the buoy 3. Furthermore the loading system 1 may also revolve about a vertical axis due to the provision of the rotary ring-shaped plate 17.

It appears that the configuration of the anchoring arrangement for the buoy 3 by means of crossed anchor chains 8 connected at the respective points of crossing 8' prevents the buoy from rocking. It is advantageous to provide three or four pairs of crossed chains. Each pair consists either of two crossed chains fastened to each other through a common link or of four chain sections leading to a common fastening ring member. The buoy may assume various shapes. It may be annular or U-shaped for instance. Moreover the tower 2 may have relatively reduced transverse dimensions since the ship is moored to the buoy proper and the latter exhibits at its inner periphery shock absorbing means for damping shocks of said buoy against the tower itself.

Figure 6:
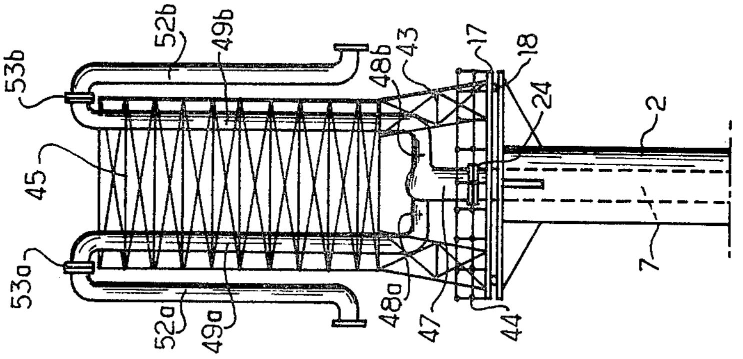
FIG. 6 is a view similar to FIG. 4 as seen in the direction of the arrow VI in FIG. 5 and showing the loading and unloading arm or boom in raised, disconnected or rest position.
Figure 5:
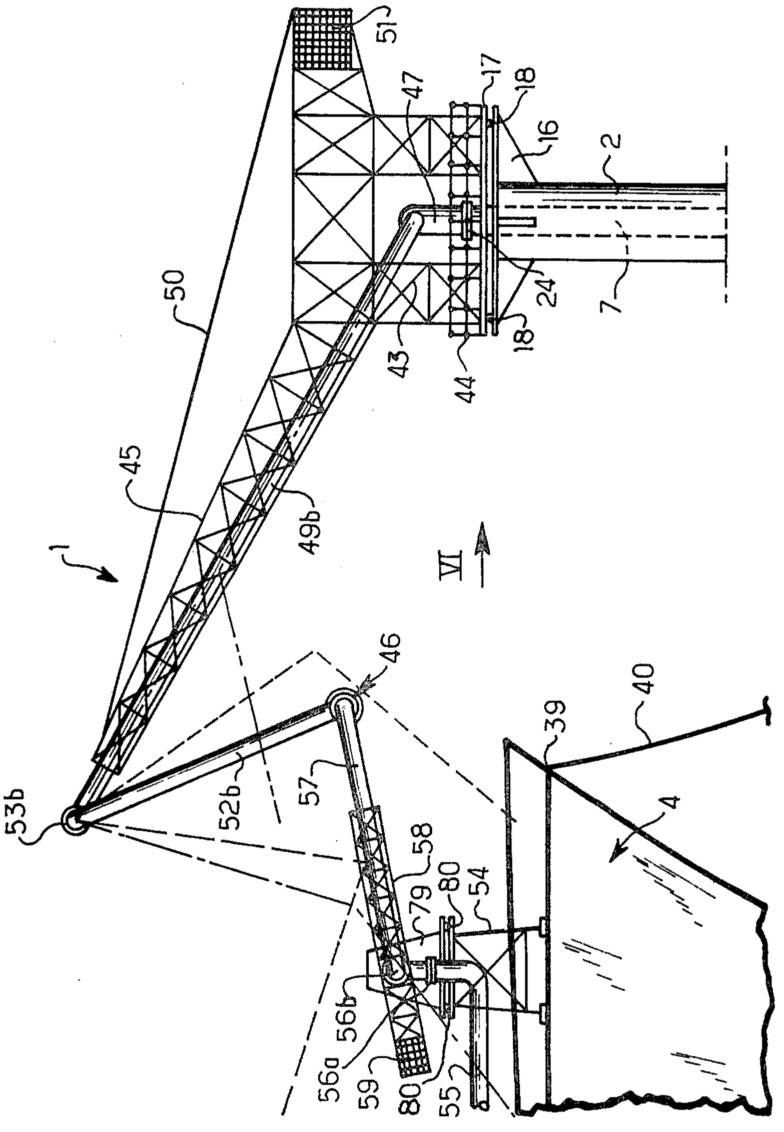
FIG. 5 is a view similar to FIG. 3 but showing another embodiment of the loading and unloading system according to the invention.

Referring now to FIGS. 5 and 6, the upper portion of the tower 2 likewise comprises a platform 16 on which is mounted a turntable 17 provided on a ball or roller ring 18. The turntable 17 carries a metallic framework 43 connected to a metallic structure 45 or the like forming a swinging crane jib having a stationary angular position of slope in the vertical plane.

Moreover the under-water pipe-lines 7 communicate at 24 by means of rotary sealing joints, respectively, each one with a pipe 47, the top part of this pipe comprising a pair of sidewise extending branches or portions 48a and 48b (FIG. 6). Each one of these portions is connected to a duct 49a, 49b, respectively. These ducts 49a and 49b for conveying flowing fluids are fastened to the metallic structure 45 which is braced or rigged by stay-wires or like guys 50. A balancing counterweight 51 is also provided.

To each one of the ducts 49a and 49b is pivotally connected through a rotary sealing joint 53a, 53b, a piping 52a, 52b (FIG. 6).

The ship 4 comprises a framework 54 supporting at least one end of a duct and preferably the ends of a pair of fluid-conveying ducts 55 opening therethrough and respectively coupled through rotary sealing joints such as 56a and 56b to corresponding pipings 57, respectively. The latter are for instance secured to a rocking or tilting metallic structure 58 forming an auxiliary loading arm or boom carrying a balancing counterweight 59 and supported by a swivelling carriage 79 mounted like a turntable on the framework 54 by means of a ball or roller ring 80. In working position the pipings 52a and 52b are connected through rotary sealing joints 46 to the piping 57, respectively.

The operation of such a system is similar to that previously described:

At first the ship 4 is moored to the buoy 3 and the ducts provided on the ship are connected to the loading arm or boom proper. The loading and unloading operations may then be carried out according to a process derived from that described hereinabove. Some positions which may be assumed by the ducts 57 on the one hand and 52a and 52b on the other hand are shown by various broken or chain-dotted phantom lines drawn in FIG. 5.

It should be noted that in the present instance the main loading arm may swing about the upstanding axis of the tower; it is however not tiltable at will as in the previous case with respect to a horizontal plane. The structure 58 and the ducts 57 on board the ship form an auxiliary loading arm or boom proper. Moreover the tower 2 made of concrete for instance does not incur any risk of being damaged owing to the movements of the ship. The vessel may indeed be moored for instance with its bow and kept spaced from the tower by a suitable means.

Figure 7:
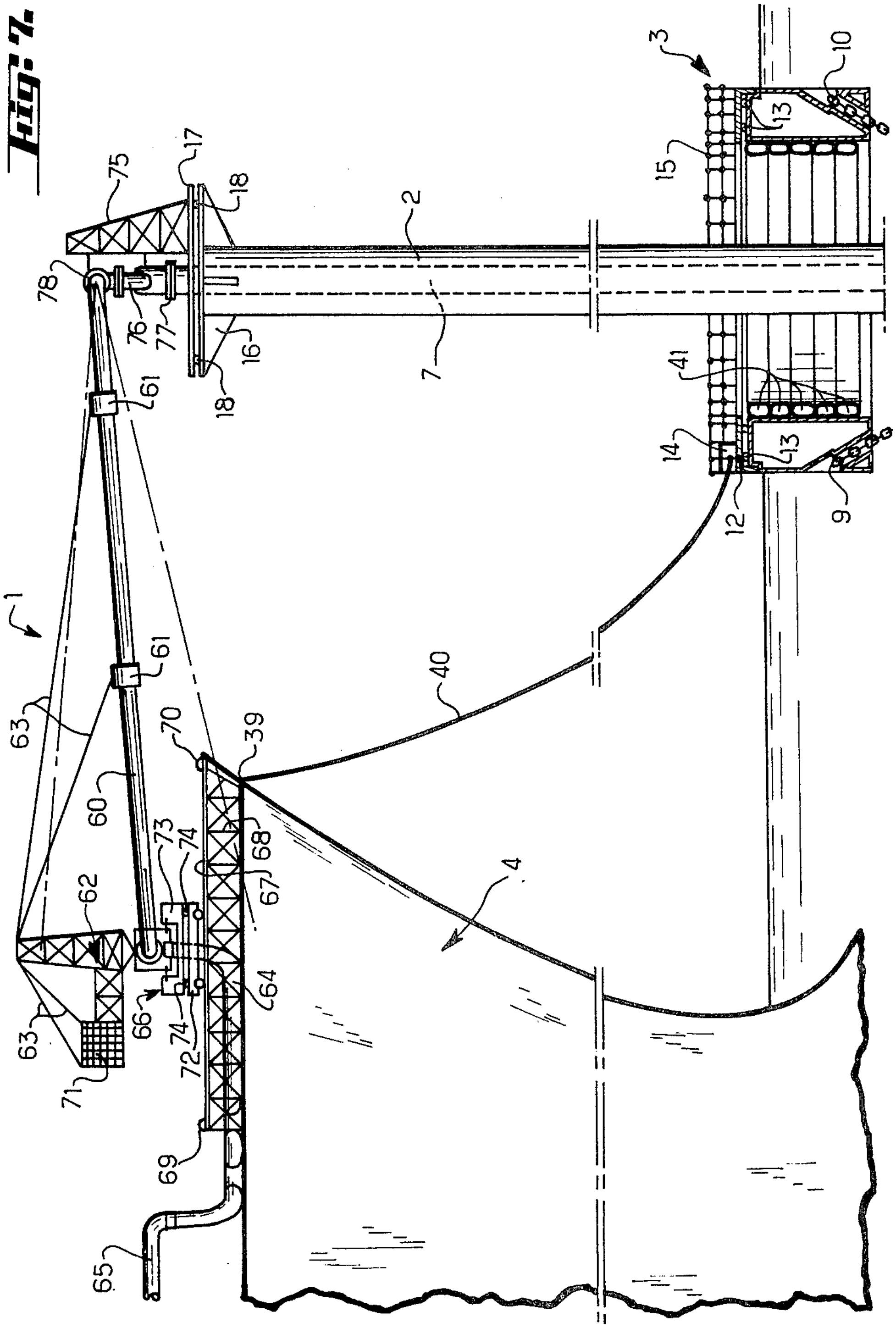
FIG. 7 is a fragmentary elevational view, with parts broken away, illustrating still another embodiment of the invention.

With reference now to FIG. 7, the loading and unloading system 1 is mounted on board the ship 4 proper, i.e. no longer on the platform 16 of the tower 2. The system 1 consists essentially of at least two fluid-conveying ducts 60 comprising collars or sleeves 61 for securing said ducts to a metallic structure forming a mast 62 by means of guys or like stay-wires 63. The ducts 60 communicate through flexible hose pipes 64 with fluid-conveying ducts 65 which communicate in turn with the cargo tanks of the vessel. The assembly of the ducts 60 and metallic structure 62 is mounted on a vehicle, truck or like carriage 66 provided for instance with wheels or skids and displaceable on a runway or slideway 67. This track 67 is located above a metallic structure 68 made for instance of sectional or structural beams. Moreover, devices forming stops 69 and 70 are provided at the ends of the trackways 67 for restricting the motion of the carriage 66. One side end of the metallic structure 62 carries a balancing counterweight 71. Means are provided for rocking or holding the ship-borne loading arm against motion in inoperative stowed position during the sea trip.

Furthermore, the upper portion 73 of the truck or vehicle 66 forms a turntable and is mounted for swinging motion through the medium of a ball or roller ring 74 onto a running or riding carriage 72 thereby enabling the swinging motion of the system 1.

As in the previous case the platform of the tower 2 supports a ring-shaped turntable 17 mounted on balls or rollers 18. A device forming a mast or like holder 75 is however provided in the present instance above the ring-shaped turntable 17. Two pipings 76 on the one hand connected through rotary sealing joints 77 to the pipe-lines 7, respectively, may on the other hand be coupled to the ducts 60 through the medium of a quick-coupling device with rotary sealing joints 78. They are moreover held or supported by the mast or post 75.

The operation of the whole plant takes place in a manner similar to that previously described except in particular for the special conditions resulting from the mounting of the loading arm or boom onto the ship proper. In particular the loading system 1 is capable of rotation about a vertical axis relative or perpendicular to the ship deck; the ducts 60 are moreover capable of rotating about a horizontal axis passing through 78 and this condition is shown by the several broken or chain-dotted phantom lines drawn in FIG. 7.

Further advantages and characterizing features of the system for loading or unloading ships at sea may be made apparent.

First of all a carriage or the like 14 moving on a substantially circular runway **14*a* (FIG. 2) provided at the top portion of the buoy 3, could be substituted for the turntable 12 mounted on the ball ring 13. In the second place the system according to the invention is specifically well adapted to the loading or unloading of tanker vessels of large capacities (of the order of magnitude of 200,000 $m^3$ or more) and this under very good conditions of safety, reliability and dependability. The tower 2** indeed although of reduced transverse dimensions does not practically incur any danger of being damaged by the stresses resulting from the shifting of the ship caused by the waves in particular since the ship is moored to a buoy which is in fact separated from said tower.

In the third place this system is accordingly particularly usable in the case of inflammable or combustible cryogenic fluids (liquefied natural gas for instance).

Figure 8:
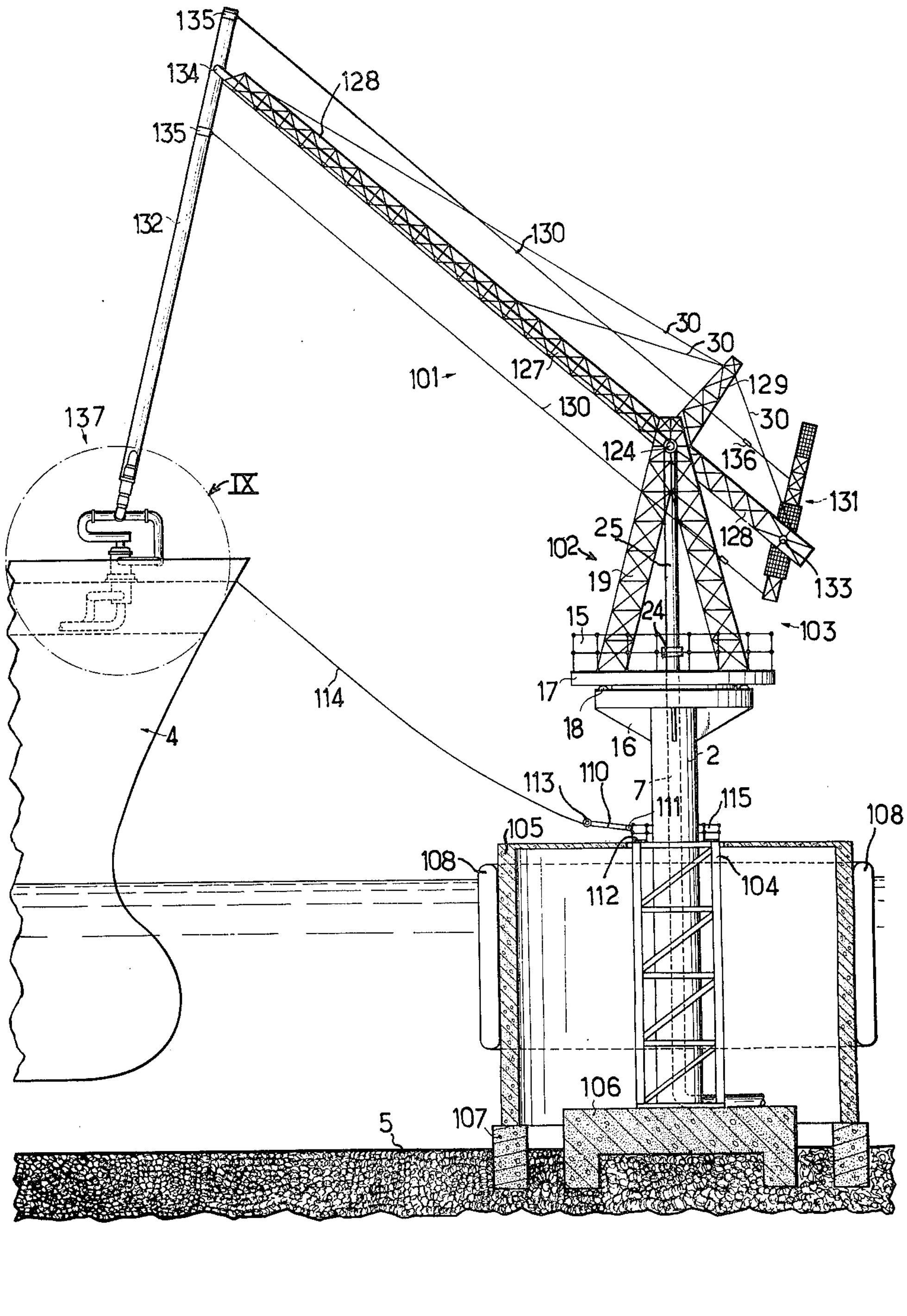
FIG. 8 is an elevational view with parts broken away of another embodiment of the ship loading and unloading system according to the invention.

Referring now to FIG. 8 the system 101 for loading and unloading a ship 4 comprises in particular a crane denoted by the reference numeral 102 and which consists essentially of a stationary tower 2 supported on the bottom of the sea and of a system 103 for transferring or handling incoherent products or goods. As already stated previously the tower 2 which may in particular be built from concrete may be secured or embedded in the bottom 5 of the sea by means for instance of a foundation or base 106. The tower 2 may also merely rest on the bottom of the sea. Moreover at least two underwater loading and unloading pipe-lines 7, respectively, extending off or from the shore for instance lead through the tower 2 to the loading system 101.

The mooring of the ship 4 is performed in particular by means of a mooring column 104 also embedded into the bottom of the sea by means for instance of the foundation or base 106. This column made for instance of a concrete structure encompasses the tower 2 while being fully separated from and independent of this tower. Moreover the loading system 101 may also include a tower 105 acting as a fender or shield for protecting against any collision from the ship and also embedded or built into the bottom of the sea by means of a foundation or base 107. The fender tower 105 is arranged in substantially concentric relation to the tower 2; according to the present form of embodiment this fender tower may possibly be constituted by the mooring column 104. The fender tower 105 is provided at its periphery with damping or shock-absorbing means 108 such as solid resilient pads or pneumatic pudding fenders arranged to form a resilient peripheral ring acting as a buffer or bumper. As shown in FIG. 8 the shock-absorber or damping means 108 are positioned at the level of those portions of the ship 4 which are likely to engage or impinge against the fender tower 105. The top face of the mooring column 104 carries a rotary ring-like device 112 adapted to revolve about the vertical centre-line axis of the mooring column or pillar. The device 112 moreover comprises at least one member 110 for mooring the ship for instance with the bow or head or stern. The mooring member 110 is pivotally mounted at 111 and provided with means 113 for securing the hawsers or ropes 114 leading from the ship. Also a gangway or catwalk 115 is provided at the top part of the mooring column of pillar 104.

The upper portion of the stationary tower 2 comprises a platform 16 on which is mounted a device forming a slewing plate or turntable 17 mounted on a ball or roller ring 18 as previously described. The turntable 17 carries a metal framework 19 shaped for instance as a derrick structure or the like. Moreover the underwater pipe-lines 7 communicate at 24 through revolving seals or like rotary joints with a pair of pipes 25 according to an shown in like that showin FIGS. 3 and 4. The pipes 25 respectively communicate at 124 with at least one duct 127 alongside of which extends a metallic beam 128. Furthermore metallic beams or outriggers 129 integral with or rigidly connected to each beam 128 are provided in co-operation with stays or guys 30.

The duct or ducts 127 moreover communicate at 134 with pipes 132 mounted for swinging motion about the duct 127. A balancing counterweight 131 pivotally mounted at 133 for swinging motion about the lower end of the beam 128 is also provided. Stays, guys or like bracing cables or ropes 130 are fastened on the one hand to the second part comprising the pipes 132 of the transfer or handling system 103 forming the loading boom by means of collars, rings or like brackets or clips 135 for fastening the stays or guys. They are on the other hand fastened to the balancing counterweight 131 and include tighteners, stretchers or like strainer or turnbuckle devices 136. Drive motors for operating a rocking or tilting device according to a selectively variable slanting position not shown but similar to that described previously are provided so as to enable the swinging motion of the loading boom with respect to the metallic framework 19 in a vertical plane about a rocking axis extending through 124.

Figure 9:
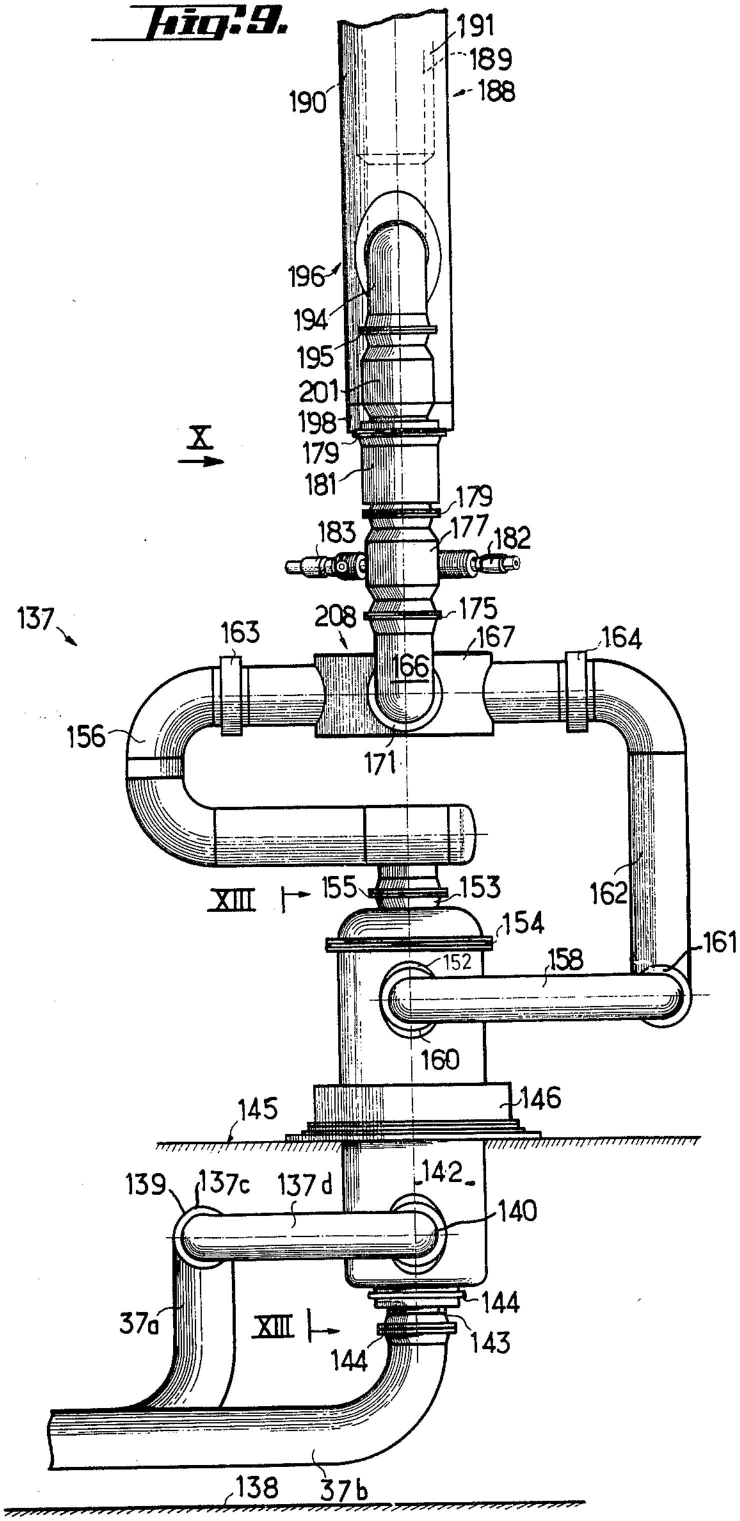
FIG. 9 is a fragmentary elevational view drawn on a larger scale with parts broken away and looking in the direction of the arrow IX in FIG. 8 and showing the piping system on the ship for connecting ducts leading from the storage tanks of the ship to the transfer or handling arrangement.
Figure 10:
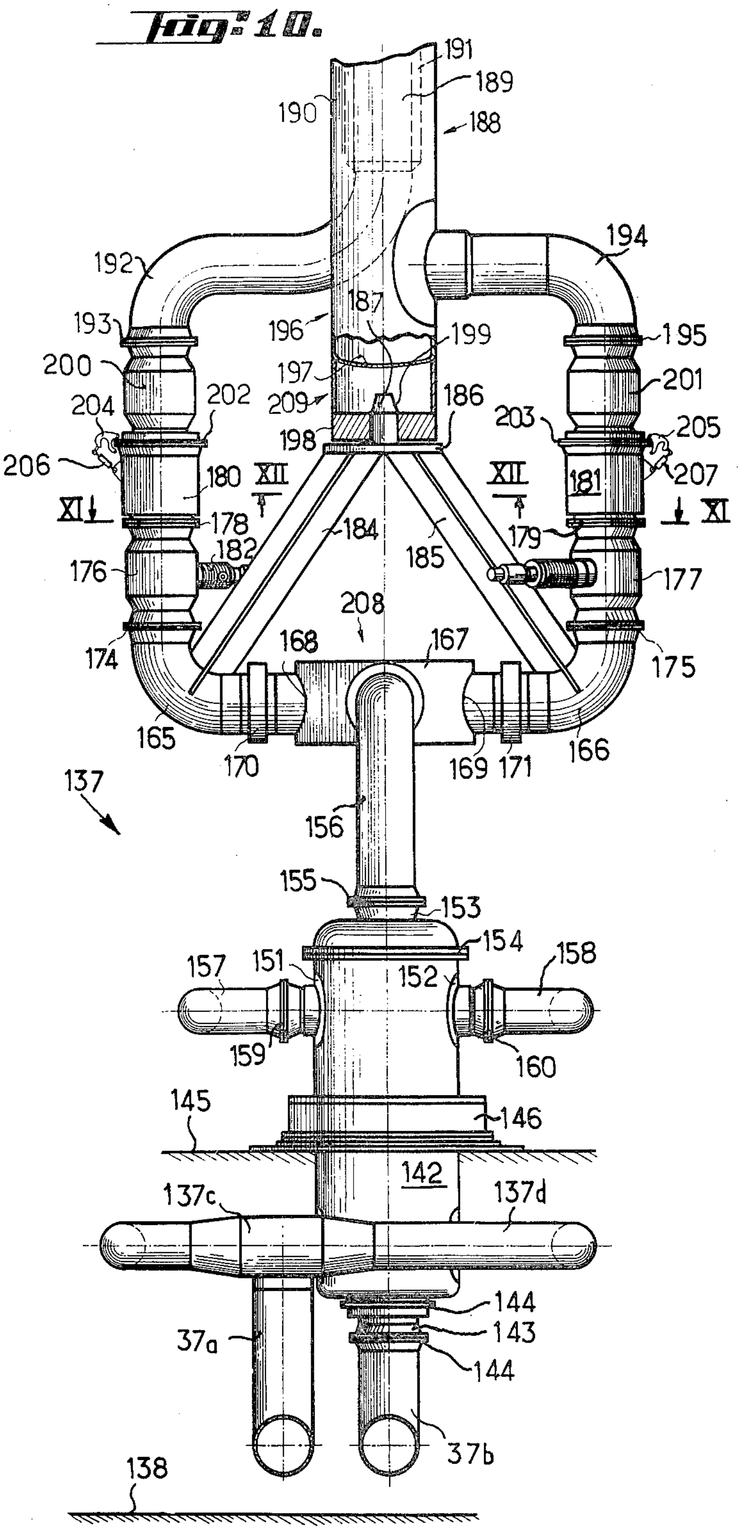
FIG. 10 is a side view taken in the direction of the arrow X in FIG. 9 with parts broken away and also showing said piping assembly.

Referring now to FIGS. 9 and 10 the piping system 137 on the ship provides for the connection on the one hand with the second part of the loading boom, i.e. with the pipes 132 and on the other hand with the fluid-conveying duct or ducts provided on the ship. As stated previously the ship preferably comprises at least two ducts 37*a* and 37*b* leading from the cargo tanks and opening substantially at the level of the main deck 138. The duct 37*b* is coupled to the central lower portion of a hollow cylindrical body 142 by a combination of connectors or like fittings such as 143 and flanges or the like 144. The duct 37*a* is divided at 139 into two ducts 137*c* and 137*d* leading at 140 to the lower peripheral portion of the cylindrical body 142. The latter forming an intermediate connecting element known per se is mounted on the upper deck or deck-erection 145. It is freely movable to revolve or slew about a relative vertical axis perpendicular to the ship deck by means of an appliance forming a rotary joint or revolving seal 146.

Figure 13:
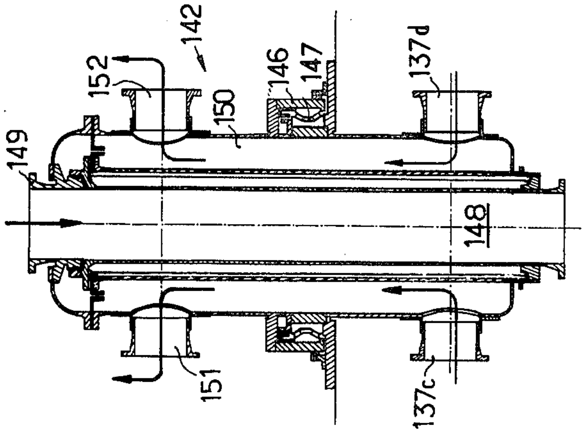
FIG. 13 is a view in cross-section taken upon the line XIII—XIII in FIG. 9 and showing a portion of the piping system provided on the ship.

As shown in FIG. 13 the rotary joint 146 comprises in particular barrel roller bearings or oblique-contact roller bearings or the like 147. Moreover the cylindrical body 142 comprises a central tube 148 opening at the top at 149. The tube 150 surrounding the tube 148 in external concentric relationship opens at its upper portion through two ports 151 and 152.

The cylindrical body 142 is connected through a combination of fittings 153 and flanges 154, 155 to a pipe 156 (FIG. 9). Also the ports 151 and 152 are connected to two pipes 157 and 158, respectively, by means of flanges 159 and 160, respectively, for instance. Both of these pipes 157 and 158 meet together at 161 and are extended by a second pipe 162 similar to the first pipe 156.

Figure 11:
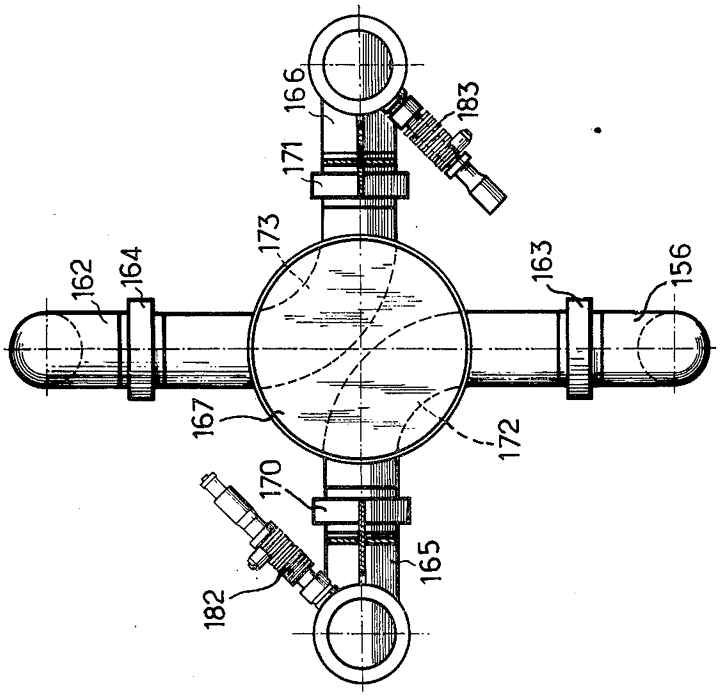
FIG. 11 is a fragmentary view in cross-section taken upon the line XI—XI in FIG. 10.

Both of these pipes or lines form loops according to the configuration such as shown in FIG. 9 and comprise at their ends revolving seals or rotary joints 163 and 164, respectively. Their shapes are such that to some extent they form a structure mechanically equivalent to the first fork or yoke of a Cardan universal joint coupling 208. The second fork or yoke of the Cardan universal joint coupling is then made up by a second pair of pipes 165 and 166 (FIG. 10). The ring-shaped device 167 indeed exhibits two openings 168 and 169 to which are connected the pipes 165 and 166 by means of rotary joint fittings or like revolving seals 170 and 171, respectively. Moreover two pipe sections 172 and 173 connected to the rotary joint fittings 170 and 163 on the one hand as well as 164 and 171 on the other hand, respectively, (FIG. 11), are also provided. They form each one inside of the ring 167 a right-angled bend and are rigidly braced so as to form the cross-piece or cross-pin of the Cardan universal joint coupling.

Figure 12:
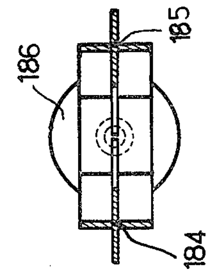
FIG. 12 is a fragmentary view in cross-section taken upon the line XII—XII in FIG 10.

The pipes 165 and 166 are further connected by means of flanges 174 and 175, respectively, to connecting portions 176 and 177 which are in turn connected by means of flanges 178 and 179 to connector fittings 180 and 181, respectively. The connecting portions 176 and 177 are each one provided with a valve 182, 183 for controlling or adjusting the flow rate of the fluids. Moreover the piping system on board the ship comprises cross-shaped sectional members 184 and 185 or the like supporting a cylindrical plate 186 topped by a centring pivot pin 187 (FIGS. 10 and 12).

The end 188 of the loading boom consists of a two-fluid conveying line comprising a central or inner pipe 189 and an outer pipe 190 surrounding the pipe 189 in concentric or coaxial relationship whereas an insulating area 191 is provided between both pipes. The central pipe 189 is formed with a pipe extension 192 terminating in a flange 193 whereas the outer pipe 190 is provided with a pipe extension 194 separated from the former one and terminating in a flange 195. The lower portion 196 of the end 188 off the loading boom terminates in a bottom 197 welded to a cylindrical part 209 consisting itself of a bottom portion formed of a thick plate 198 provided with a bore in its central portion at 199 for allowing the pivot pin 187 to extend therethrough. Parts 200 and 201 forming fluid check-valves are connected to the flanges 193 and 195 and terminate in flanges 202 and 203. Finally there is provided a quick-operated connection and disconnection arrangement. It comprises at least two members 204 and 205 for assembling together the end portions of the pipes or ducts leading from the ship and from the loading boom, the assembly being carried out in particular by means of power rams or like actuators 206 and 207.

The operation of this whole system is the following:

After the ship has been moored at 113 to the mooring pillar or column 104 by means of two hawsers or the like 114 preferably secured at two different fastening points, respectively, on the ship the loading boom is coupled to the piping system on board the ship 137. More specifically the piping system on the ship will be positioned with respect to the end 188 of the loading boom so that the centring pivot pin 187 be in axially aligned registering relationship with the bore 199 provided at the lower portion 196 of the end 188 of the loading boom.

For this purpose the great movableness of the loading boom provided by its swivelling connection in particular at 124 and 134 proves to be very useful. Upon a proper positioning the end portions of the pipes or ducts of the piping system on board the ship and of the end of the loading boom may then be connected together by means of the assembling members 204 and 205 as well as of the actuators or power rams 206 and 207.

The loading and/or unloading operations may then be started and carried out by actuating in particular the valve 182 and 183 and in a way substantially similar to that previously described. It should however be pointed out that the present form of embodiment of the invention enables in particular to carry out the simultaneous transfer of several fluids since the pipe-line 127 may for instance be a two-fluid conveying line. Under such circumstances both pipe means such as shown at 27*a* and 27*b* in FIG. 4 may be used for simultaneously transferring four fluids.

These fluids may be of differing physical and/or chemical natures and may flow either together in a same direction as is the case when various fractions originating from petroleum or like mineral oil or natural gas for instance have to be blended or mixed with each other or these fluids as previously described may flow in opposite directions, respectively. Thus when a ship is being unloaded the gases resulting from the boil-off or evaporation are carried back to the ship tanks which are thus kept at a pressure higher than atmospheric pressure.

Moreover as already stated previously the ship 4 and the loading and unloading system 101 may assume various relative positions with respect to each other according to the forces they undergo during the loading and unloading operations.

Furthermore in case of technical hitches, malfunctions, breakdowns or like operating failures or deficiencies the check-valves 200 and 201 may be operated so as to close for stopping the flow of fluids therethrough. Thus upon disconnecting and separating the piping system on board the ship from the loading boom the check-valves may be actuated in order to prevent in particular liquid fluids still left within the pipes from trickling, dripping or oozing. They also prevent some gases which generally are inflammable from escaping or being vented or discharged to the open air.

Additional advantageous features of the system for loading or unloading ships at sea are the following.

A mooring carriage, truck or like trolley travelling along a substantially circular runway or track may be provided as in the first embodiment. This runway or track is then provided at the top surface of said mooring column or pillar. Moreover the provision of a fender or shielding tower for protecting against collisions or impacts from the ship enables to overcome the inconveniences set forth in connection with the use of buoys and the present system proves to be particularly well adapted to tanker ships with very large capacities since in particular the functions of mooring the ship and protection against collisions or shocks therefrom are separated and distinct from each other.

Furthermore the piping system 137 on board the ship 4 provides a fully free connection between the ship and the transfer arrangement 101. As a matter of fact the design and use of a rotary joint connector fitting or like revolving seal 146 and of a contrivance or apparatus equivalent to a Cardan universal joint coupling in cooperation with the various capabilities of displacement or swivelling or swinging motions of the loading boom readily allow any relative displacements of the ship with respect to the tower 2. In particular the whole system enables an evolution of 360° of the ship in a horizontal plane about the transfer system. It also enables relative vertical displacements of the ship with respect to the tower owing in particular to the fact that the piping system on the ship is free to swivel so as to assume any directional position according to requirements.

Finally the present embodiment enables to carry out multiple fluid transfer owing to the provision of pipings comprising for instance a central or inner liquid-conveying pipe and an outer coaxially surrounding pipe for draining off for instance the gas or vapour evolved from said liquid (in the case in particular of liquefied natural gas).

In some forms of embodiment previously described herein the tower comprises a movable swivelling or pivotally mounted loading boom forming or providing at least one two-fluid conveying pipe-line with a coaxial structure in which two different fluids may flow in any directions according to requirements without never mixing or blending with each other. Such a loading boom is connectable to a piping system on board the ship comprising two pairs of pipe means assembled together through the agency of rotary joint connector fittings to pipe sections bent at right angles and rigidly braced or interconnected so as to form a part which is mechanically equivalent to the cross-piece or cross-pin of a Cardan universal joint coupling. In this manner the unavoidable motions between the ship and the end of the movable boom do not prevent the loading and unloading due to the provision of the Cardan-like swivelling connection or coupling of the piping system on board said ship.

According in particular to the foregoing alternative embodiment lastly described the end of the movable boom is provided with a relatively thick plate formed with a bore or hole adapted to be engaged by a centring pivot pin integral with said piping system on the ship. The movable boom and said piping system are thus caused to be positioned or located properly with respect to each other owing to these co-operating means and the corresponding duct or pipe elements are connected to each other in this position through quick acting fastening or connector means operated by actuators.

Under some circumstances it may be advantageous to further facilitate the operating steps for connecting the end of the movable boom to the piping system on board the ship. The operating step consisting in causing the centring pivot pin to engage the hole formed in said thick plate may indeed sometimes prove to be inconvenient or troublesome in view of the relative motions between the ship and the movable boom.

Furthermore these same motions once the connection has been carried out and the loading and/or unloading operations started may sometimes give rise to relatively significant stresses at the rotary joint couplings or like revolving seals of the pipe assembly arranged as a Cardan universal joint coupling on board the ship.

The present invention also enables to overcome such inconveniences which have been mentioned for special cases with the form of embodiment shown in FIGS. 14 to 17 and comprising a pole or jib for gripping and handling the end of the movable loading boom which is pivotally mounted for swivelling motion on the deck of said ship and controllably adjustable in position with respect to the piping system on board said ship.

Thus is solved the problem of the connection of the end of the loading boom since once said end has been caught by said gripping pole the connection may be made easily by acting upon the controllably adjustable positioning device of said pole because said piping system on the ship and said gripping pole belong to the same reference system which is the ship's deck, i.e. are ship-bound and therefore are not given relative random motions.

Figure 14:
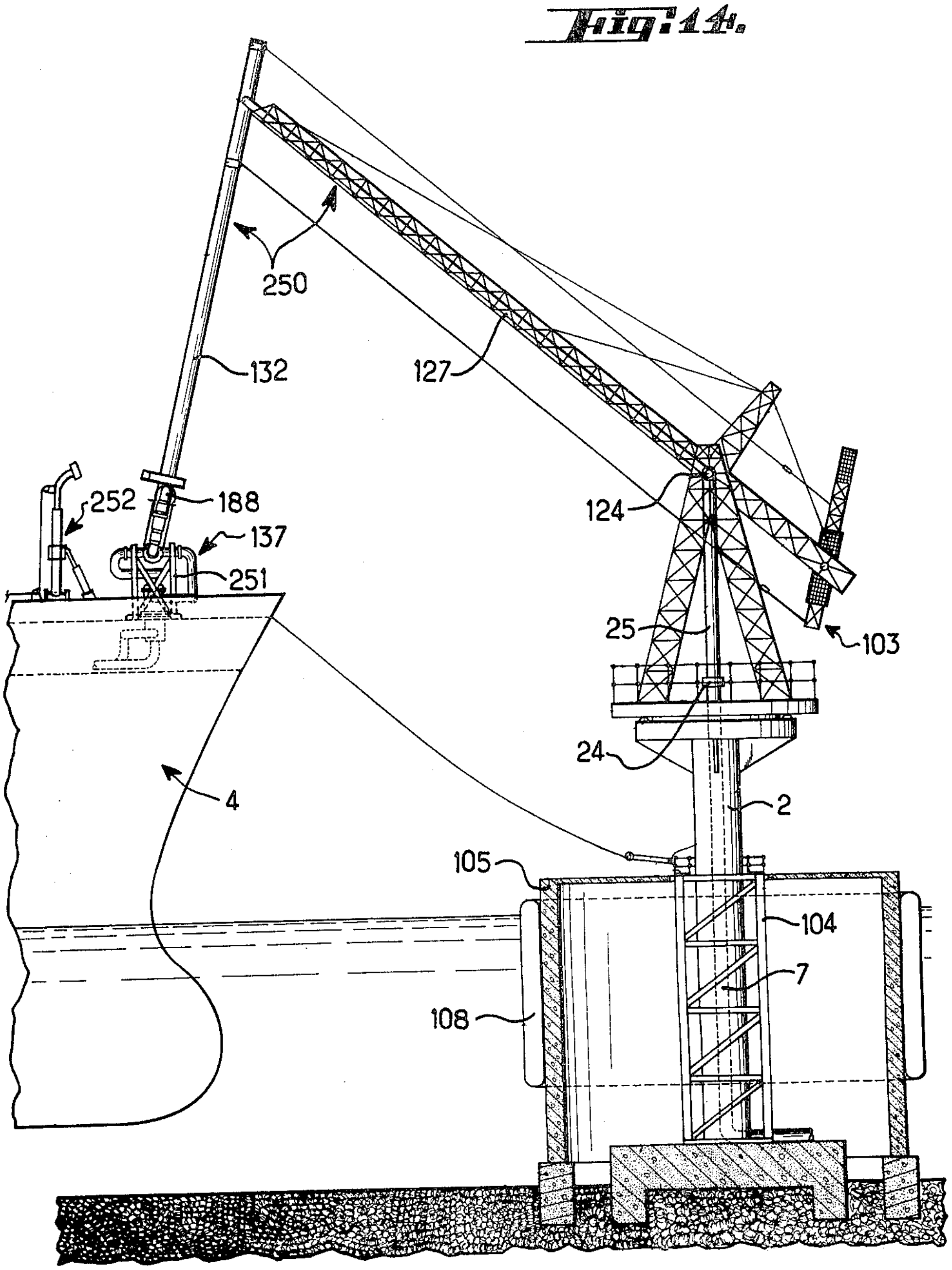
FIG. 14 shows a ship in loading and/or unloading position moored near the tower supporting the movable boom said ship being fitted with another form of embodiment according to the present invention.

On the other hand owing to this form of embodiment the stresses likely to be exerted upon said movable joint fittings are removed owing to a rigid framework taking up the mechanical forces exerted upon said Cardan universal joint coupling and upon said intermediate connecting element for the piping system on said ship. Referring now to the form of embodiment illustrated in FIGS. 14 to 17 the complete system still comprises a mooring column or pillar 104 for the ship 4 surrounding a tower 2 serving to support the system 103 for the transfer of incoherent products or goods. A fender tower 105 protecting against collisions or shocks from the ship is disposed in concentric relationship about the tower 2 and is itself encompassed by damping or like shock-absorbing means 108. The under-water pipe-lines 7 communicate through rotary joint fittings 24 with two tubes 25, respectively, according to the arrangement shown in FIGS. 3 and 4. In extension of these tubes 25 are the pipes 127 and 132 pivotally connected to each other. FIG. 14 moreover shows the end 188 of the movable loading boom 250 coupled to the piping system 137 on the ship 4 which is provided with a rigid framework 251 for taking up the mechanical forces in the present embodiment. Also shown in said gripping pole 252 in a raised position and disconnected from the end 188 so as not to interfere with the free swivelling motion of the latter with respect to the piping system 137 during loading and/or unloading.

FIGS. 15 to 17 more particularly show the improvements brought about by the present embodiment. In particular the gripping jib-pole 252 is a telescopic structure since it consists of a pair of coaxial tubes 255 and 256 the tube 256 being slidably mounted within the tube 255 and the overall length of the pole being adjustable by means of a pair of inner actuators or like power rams 257 and 258 mounted endwise in aligned registering abutting relationship between a stationary fulcrum 259 for pivotal connection with respect to the tube 255 and the bottom end 260 of tube 256. The lower end of tube 256 is pivotally connected through the agency of a cross-piece or cross-pin 261 on a base or pedestal 262 itself integral with the deck 145 of the ship. The directional attitude of the pole 252 is controlled two actuators or power rams 265 and 266 exerting opposite actions and pivotally connected on the bases or pedestals 267 and 268, respectively, secured on the ship's deck and the piston rods 269 and 270 of which are connected at their ends to a cylindrical collar or ring 271 encompassing the tube 255. The bases 262, 267 and 268 form an isosceles triangle. All of the actuators 257, 258, 265 and 266 are operated from a control desk not shown because it is well known per se and preferably comprising means for the synchronous operations of the various actuators so as to automatically and accurately compose and generate the desired motion of the pole 252.

The upper portion of the tube 256 is bent and terminates in an end piece 272 formed with a frusto-conical or tapering recess 273. A central thoroughfare hole or passageway 274 extends through the end piece 272 and opens at the bottom of the recess 273. A cable or rope may thus be passed inside of the end piece to extend through the hole 274 out of the tube 256 at said bent portion and be reeved over a pulley or sheave 275 carried by the tube 256 and then about a pulley or sheave 276 secured on the deck 145 for being pulled by any suitable means not shown.

A ring-shaped member 280 is mounted for free rotation about the end 188 of the movable loading boom through the agency of a ball bearing 281. This ring-shaped member carries in turn another end piece 282 of a general shape like that of the end piece 272 and formed with a frusto-conical or tapering recess 283 substantially identical with the recess 273. A rope 284 is normally hanging from this end piece to which it is fastened at 285 in the bottom area of the recess 283. The end 188 and the gripping pole 252 may be very quickly coupled to each other through these co-operating mating end pieces through the agency of a ball 286 forming a pivotal connection means and by the use of a procedure to be described hereinafter. The ball 286 is formed with a central bore 287 which extends diametrally therethrough and opens on either side thereof into wide frusto-conical or tapering recesses 288.

Referring now in particular to FIGS. 16 and 17 there is seen the structure of the rigid framework 251 for taking up mechanical forces exerted upon the piping system 137 on the ship and more specifically on its Cardan universal joint coupling and on its intermediate connecting element 142. In other words the function of the framework 251 is to protect the rotary joint fittings 146, 163, 164, 170 and 171 against excessive stresses which may result from the motions of the ship during loading and/or unloading operations such as shown in FIG. 14. For this purpose the framework 251 comprises at its base 289 a circular sectional member 290 and is mounted by this means onto a circular guide 291 secured on the deck in coaxial relation to said intermediate element 142 so as to be rotatable together with the latter. On the other hand the framework 251 comprises at its upper part four ball bearings 293, 294, 295 and 296 mechanically holding both pipe legs or branches 172 and 173 bent at right angles and forming said cross-piece of the Cardan universal joint coupling 208. These ball bearings are thus protecting the rotary joint fittings 163, 164, 171 and 172, respectively, against excessive stresses as mentioned hereinabove. Moreover the stresses exerted upon the rotary joint fitting 146 are also taken over by the movable framework 251 owing to the sectional member 290 and the circular guide 291 enabling the free rotation of said framework.

On the other hand this framework 251 is topped by a guiding and centering construction 298 consisting essentially of a pair of vertical webs or cheeks 299 and 300 between which is secured a holder means 292 formed with a frusto-conical or tapering recess 301 adapted to accommodate a centering cone 302 of complementary shape and integral with the end 188 of the movable loading boom. Quick-acting fastening members 303 operated by actuators or like power rams 304 enable to lock the cone 302 within the recess 301 at the end of the coupling operation. Moreover the upper portions of the webs or cheeks 299 and 300 are formed with cut-outs or notches 305 for automatic positioning whereas the connectors 180 and 181 are kept in a substantially vertical position during the coupling operation (i.e. in proper position for joining with the corresponding terminal pipe portions 306 and 307 of the loading boom 250) owing to two sets of respective stop members or abutments 309 and 310 integral with the webs 299 and 300.

The operating steps for connecting the loading boom 250 to the piping system 137 on board the ship will now be described:

The ship 4 is moving slowly towards the tower 2 and is moored at such a distance therefrom that the portion 132 of the loading boom 250 is nearly arranged vertically above the piping system 137 on the ship. For this purpose the screw propeller of the ship is reversing for backward motion and the adjustment of the distance is carried out by operating the mooring windlasses. Although this step of the process is not specifically shown in the drawings it is easily understood that at this particular time the rope 284 which is hanging from the end 188 of the loading boom may be easily gripped from the ship's deck. On the other hand a rope 312 is associated with the pole 252 and at this stage of the operating process is reeved over the pulleys or sheaves 275 and 276 to extend through the hole 274 of the end piece 272 and hangs freely from the latter down to the deck 145. It is therefore easy to connect the rope 312 to the rope 284 (through any suitable tying device denoted at 311) after having passed the latter through the central bore or passage-way extending through the ball 286. Then by pulling or drawing the rope 312 the pole or jib 252 which is kept in a balanced condition by means of a small oil pressure within the actuators is quickly fastened to the end 188 of the movable boom 250 until it assumes the position shown in FIG. 16 both end pieces 272 and 282 being then positioned in front of each other and the ball 286 being fitted between said end pieces within said frusto-conical recesses 273 and 283. Owing to the provision of the frusto-conical recesses 288 on either side of the bore 287 which extends diametrally through the ball 286 the latter may perform the function of a pivotal connection similar to that of a ball-and-socket joint or swivelling connection between the pole 252 and the end 188.

The gripping pole 252 is then made rigid by gradually increasing the pressure in the actuators 257, 258, 265 and 266 until said pole may integrally convey the motion of the ship to the end 188. Then the connection between the end 188 and the piping system 137 on the ship may be readily carried out from the actuator control desk. After connection and locking of the elements caused to engage each other the gripping pole 252 is disconnected and brought back to a rearward or retracted position and the ship is left free (the reverse motion of the screw propeller is stopped). The loading and/or unloading operations between the tower 2 and the ship 4 may then be started.

It should be understood that the invention is not at all limited to the forms of embodiment described and shown which have been given by way of examples only. In particular it comprises all the means constituting technical equivalents of the means described as well as their combinations if same are carried out according to its gist and used within the scope of the appended claims.

What is claimed is:

1. A system for loading and/or unloading at seas a ship conveying incoherent products such as in particular fluids and/or powdery solid material, said system comprising a ship mooring column of substantially ring shaped configuration, embedded into the bottom of the sea, an arrangement for transferring said incoherent products comprising a loading and unloading tower supported by the bottom of the sea having an emerged portion and a movable loading arm mounted on said emerged portion, said mooring column surrounding and encompassing said tower in spaced relationship, at least one duct means provided on said loading arm and comprised of two coaxial pipes for the simultaneous flow of fluids flowing in selected directions, an elongated beam framework supporting a first portion of said duct means on its length, said framework being articulated at an intermediate point thereof on the top of said tower of said arrangement, a second portion of said duct means being pivotally connected to said first portion at one end of said beam framework, a balancing counterweight pivotally connected to the other end of said beam framework, two stays connecting said counterweight to said second portion, said two stays being disposed in parallel relationship with said beam framework and equally spaced apart therefrom so as to form a kind of parallel motion with said counterweight and a part of said second portion, respective separate parallel tube extensions for both said coaxial pipes provided at a free end of said second portion, said respective separate substantially parallel tube extensions having flanges at their ends, a piping system on board said ship, said flanges serving for connecting said duct means to said piping system, separable centering means provided between said loading arm and said piping system, said centering means comprising a cooperating pivot and complementary shaped recess selectively provided at the end of said second portion and on said piping system; said piping system comprising: a first pair of pipes at the upper portion thereof, the respective ends of which are in horizontal alignment, two pipe sections forming each one a leg bent at right angles and rigidly braced so as to form a cross-piece, respective rotary joints at two opposite ends of said cross-piece joining said respective ends of said first pair of pipes to said ends of said cross-piece, a second pair of pipes having substantially parallel flanged free end portions corresponding to said tube extensions of said second portion of said duct means and cooperating therewith for connecting said loading arm to said piping system whereas the other ends of said second pair of pipes are in horizontal alignment and hinged through respective rotary joints hingedly connecting said other ends of said second pair of pipes respectively to the other two opposite ends of said cross-piece, said first and second pairs of pipes forming with said two pipe sections an assembly mechanically equivalent to a universal joint coupling, and wherein each pipe of said second pair of pipes comprises an adjustable action valve inserted in series therein for adjustably controlling the flow rate of incoherent product flowing in said pipes.

2. A system according to claim 1 wherein a cylindrical fender tower encompasses said mooring column in substantially coaxial relationship for protecting said mooring column against collisons from said ship, said fender tower being embedded in the sea bottom.

3. A system according to claim 2, characterized in that said fender tower comprises at its periphery shock absorbing means forming bumpers and located at the level of those portions of said ship which are likely to impinge against said fender tower.

4. A system according to claim 1, comprising a ring-shaped device rotatably mounted at the upper part of said mooring column, said ship being moored to said ring-shaped device.

5. A system according to claim 1, wherein said centering means comprise a first plate secured to said piping system, a pivot pin being upwardly directed on said first plate and a second plate exhibiting said recess and mounted at the end of said loading arm.

6. A system according to claim 1, characterized in that said piping system on said ship comprises an intermediate connection element mounted on the ship's deck and freely movable for rotation about a relative vertical axis.

7. A system according to claim 6, wherein said piping system is surrounded by a rigid framework mounted on a circular guide secured onto said deck of said ship in coaxial relation to said intermediate connection element so as to be able to rotate together with the latter, said framework comprising four ball bearings supporting each end of said cross-piece of said assembly mechanically equivalent to a universal joint coupling and disposed in parallel relationship and adjacent to the respective rotary joints connected to said ends of said cross-piece; so that said rigid framework is capable of taking up the mechanical forces exerted upon said assembly mechanically equivalent to a universal joint coupling and upon said intermediate connection element.

8. A system according to claim 1, wherein each tube extension of said second portion of said duct means comprises a check-valve inserted in series therein and adapted to be operted for being closed upon disconnecting the end of said loading arm from said piping system on said ship.

9. A system according to claim 1, comprising a gripping pole for manipulating the end of said movable loading arm, a universal joint coupling connecting said loading arm to the deck of said ship, two controllable power rams articulated between a point of said gripping pole and respective hinge bases on said deck; said hinge bases and said universal joint coupling forming a substantially isoceles triangle.

10. A system according to claim 9, wherein said pole is of a telescoping construction and comprises at least two coaxial tubular portions of different diameters so that one said tubular portion is capable of entering the other one, a controllable power ram being connected between both tubular portions for controlling the telescoping movement of said tubular portions.

11. A system for loading and/or unloading at sea a ship conveying incoherent products such as in particular fluids and/or powdery solid material, said system comprising: a ship mooring column of substantially ring shaped configuration embedded into the bottom of the sea, an arrangement for transferring said incoherent products comprising a loading and unloading tower supported by the bottom of the sea having an emerged portion and a movable loading arm mounted on said emerged portion, said mooring column surrounding and emcompassing said tower in spaced relationship, at least one duct means provided on said loading arm and comprised of two coaxial pipes for the simultaneous flow of fluids flowing in said pipes respectively either in a same direction or in opposite directions, an elongated beam framework supporting a first portion of said duct means on its length, said framework being articulated at an intermediate point thereof on the top of said tower of said arrangement, a second portion of said duct means being pivotally connected to said first portion at one end of said beam framework, a balancing counterweight pivotally connected to the other end of said beam framework, two stays connecting said counterweight to said second portion, said two stays disposed in parallel relationship with said beam framework and equally spaced apart therefrom so as to form a kind of parallel motion with said counterweight and a part of said second portion, both said coaxial pipes being provided at a free end of said second portion, respective separate parallel tube extensions, said respective separate parallel tube extensions having flanges at their ends, a piping system on board said ship, said flanges serving for connecting said duct means to a said piping system, separable centering means provided between said loading arm and said piping system, said centering means comprising a cooperating pivot and complementary-shaped recess selectively provided at the end of said second portion and on said piping system; further comprising a gripping pole for manipulating the end of said loading arm, a universal joint coupling connecting said gripping pole to a deck of said ship, two controllable power rams articulated between a point of said gripping pole and respective hinge bases on said deck, said hinge bases and said universal joint coupling forming a substantially isosceles triangle and cooperating coupling and swivelling means provided for both said gripping pole and said end of said loading arm, said cooperating coupling and swivelling means including a pair of cooperating end pieces, one of which is carried by the end of said pole and the other by said loading arm, each end piece being formed with a frusto-conical recess and a ball adapted to fit between said end pieces within said frusto-conical recesses to form with the latter a swivelling junction.

12. A system according to claim 11, wherein said piping system on said ship comprises:

a first pair of pipes at the upper portion thereof, the respective ends of which are in horizontal alignment, two pipe sections forming each one a leg bent at right angles and rigidly braced so as to form a cross-piece, two opposite ends of said cross-piece being hinged to said respective ends of said first pair of pipes through respective rotary joints, a second pair of pipes having substantially parallel flanged free end portions corresponding to said tube extensions of said second portion of said duct means and co-operating therewith for connecting said loading arm to said piping system, whereas the other ends of said second pair of pipes are in horizontal alignment and hinged, through respective rotary joints, to the other two opposite ends of said cross-piece, respectively, said first and second pairs of pipes forming with said two pipe sections an assembly mechanically equivalent to a universal joint coupling.

13. A system according to claim 12, characterized in that said end piece carried by said loading arm is secured to a rotary ring-shaped member mounted on said loading arm in coaxial relation thereto through the medium a ball bearing.

14. A system for loading and/or unloading at sea a ship conveying incoherent products such as in particular fluids, said system comprising: a ship mooring means of substantially ring shaped configuration, secured to the sea bottom, a loading and unloading tower supported by the bottom of the sea, an emerged articulated loading arm on said tower, said mooring means surrounding and encompassing said tower in spaced relationship, at least one duct means on said loading arm for the flow of said incoherent products, a piping system on board said ship, two parallel tube extensions provided on a free end of said duct means, flanges at other ends of said tube extensions for connecting said duct means to said piping system, said piping system further comprising: a first pair of pipes at the upper portion thereof, the respective ends of which are in horizontal alignment, two pipe sections forming each one a leg bent at right angles and rigidly braced so as to form a cross-piece, rotary joints, two opposite ends of said cross-piece being hinged to said respective ends of said first pair of pipes through respective of said rotary joints, a second pair of pipes having substantially parallel flanged free end portions corresponding to said tube extensions of said duct means and cooperating therewith for connecting said loading arm to said piping system, the other ends of said second pair of pipes being in horizontal alignment, rotary joints, said other ends of said second pair of pipes hinged through respective of said last-named rotary joints respectively to the other two opposite ends of said cross-piece, and said first and second pair of pipes forming with said two pipe sections an assembly mechanically equivalent to a universal joint coupling.

* * * * *

UNITED STATES PATENT AND TRADEMARK OFFICE

CERTIFICATE OF CORRECTION

PATENT NO. : 4,090,538

DATED : May 23, 1978

INVENTOR(S) : Michel Kotcharian

It is certified that error appears in the above-identified patent and that said Letters Patent are hereby corrected as shown below:

Column 2, line 5: change "anchoring" to --anchored--.

Column 8, line 40: change "of" to --or--.

Column 8, line 49: change "shown in like that showin" to --arrangement like that shown in--.

Column 16, line 64: change "operted" to --operated--.

Signed and Sealed this

***Seventh* Day of *November 1978***

[SEAL]

*Attest:*

RUTH C. MASON
*Attesting Officer*

DONALD W. BANNER
*Commissioner of Patents and Trademarks*